March 14, 1933.  R. O. LUND  1,901,660

HOSE REEL

Filed May 11, 1932

INVENTOR
Rudolph O. Lund
BY
ATTORNEYS

Patented Mar. 14, 1933

1,901,660

UNITED STATES PATENT OFFICE

RUDOLPH O. LUND, OF NEW YORK, N. Y., ASSIGNOR TO CROKER FIRE PREVENTION CORP., OF NEW YORK, N. Y., A CORPORATION OF NEW YORK

HOSE REEL

Application filed May 11, 1932. Serial No. 610,544.

The object of my invention is to provide a hose reel in which the fluid supply line is at all times connected to the hose, through the reel drum, whereby the hose may be used with the desired length unrolled from the drum.

A further object is to provide a swinging hose reel of the above character in which the fluid supply line is unaffected by the swinging of the reel.

My invention more specifically includes a swinging hose reel in which the fluid supply line comprises a vertical section arranged axially with respect to the swinging support, a horizontal section arranged axially with respect to the drum and a radial section connected to the hose; the radial section being rotatably mounted on the horizontal section and the horizontal section swinging on the vertical section of the fluid supply line.

A practical embodiment of my invention is represented in the accompanying drawing, in which Fig. 1 represents the hose reel in top plan;

Figure 1:
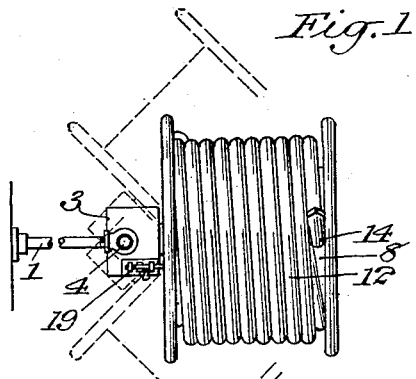
Figure 2:
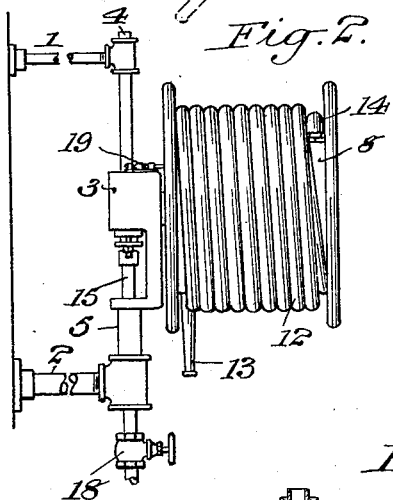
Fig. 2 represents the same in side elevation.
Figure 3:
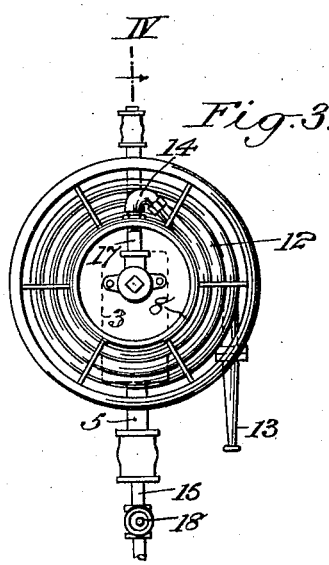
Fig. 3 represents the hose reel in front elevation.
Figure 4:
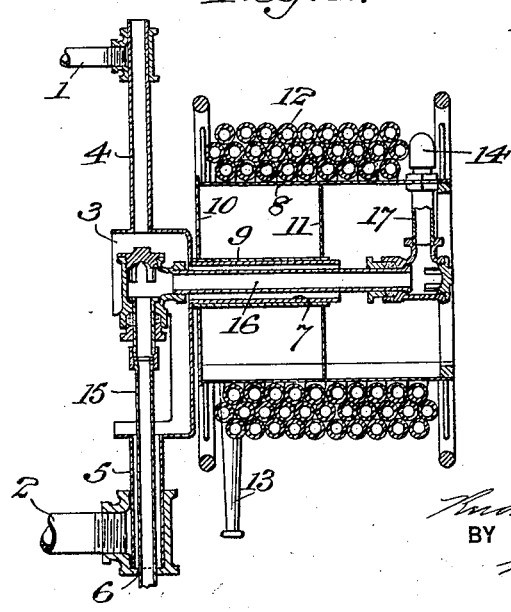
Fig. 4 represents on an enlarged scale a vertical central section taken in the plane of the line IV—IV of Fig. 3, looking in the direction of the arrows.
Figure 5:
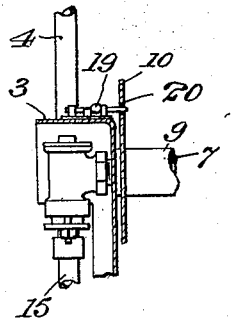
Fig. 5 represents a detail section showing the means for locking the drum to its swinging support.

The upper and lower bracket members are denoted by 1 and 2, which bracket members may be secured to a wall or other base. The swinging support comprises an intermediate portion 3 and upper and lower extensions 4 and 5 fitted to swing in the upper and lower bracket members 1 and 2. The upper extension 4 may or may not be tubular as desired, but the lower extension 5 is tubular and it rests at its bottom on an interior annular shoulder 6 of the lower bracket member 2.

A laterally disposed tubular member 7 projects from the intermediate portion 3 of the swinging support on which laterally disposed member 7 the hose drum 8 is rotatably mounted in any convenient manner, as for instance by providing the drum with a sleeve 9 fitting over the laterally disposed member 7 of the swinging support, said sleeve 9 being connected to the outer periphery of the drum by webs 10 and 11.

The hose 12 is wound upon the drum and is provided at its free end with a suitable nozzle 13 and is connected at its inner end to a hose fitting 14 carried by the drum.

The means for supplying fluid to the hose is herein shown as comprising the following elements: A vertically disposed section 15 of the fluid supply line passes upwardly through the lower extension 5 of the swinging support along the axis of the support. A lateral section 16 of this fluid supply line extends through the laterally disposed tubular member 7 of the swinging support along the axis of the drum 8 and the inner end of this section 16 is mounted to swing on the vertical section 15 of the supply line along the axis of the swinging support. A radially disposed section 17 of this fluid supply line is permanently attached to the hose fitting 14 and is rotatably mounted on the outer end of the lateral section 16 of the fluid supply line.

The fluid tight connections between the three sections may be of any well known or approved construction.

The vertical section 15 of the fluid supply line may be provided with a suitable valve 18 for controlling the supply of fluid to the hose 12.

The bolt 19 carried by the intermediate member 3 of the swinging support may be used for locking the drum to the support against rotation on its laterally disposed member 7 by entering the bolt in the hole 20 in the web 10 of the drum.

From the above description it will be seen that in use any desired length of hose may be unwound from the reel and the hose then used, thereby eliminating the necessity of unwinding the entire length of hose from the reel before using the hose. It will furthermore be seen that this result is obtained by the arrangement of the vertical section of the fluid supply line along the axis of the swinging support, the arrangement of the horizontal section of the fluid supply line along the axis of the drum and the rotatable mounting of the radial section of the fluid supply line on the horizontal section 16.

It is evident that various changes may be resorted to in the construction, form and arrangement of the several parts without departing from the spirit and scope of my invention, and hence I do not intend to be limited to the particular embodiment herein shown and described, but

What I claim is:

1. In a hose reel, a hose carrying drum, a support therefor including a hollow laterally disposed member on which the drum is rotatably mounted, and an independent fluid supply line extending through said laterally disposed member and connected to the hose wound on the drum.

2. In a hose reel, a hose carrying drum, a swinging support therefor including a hollow non-rotatable laterally disposed member on which the drum is rotatably mounted, and a fluid supply line extending through said laterally disposed member and connected to the hose wound on the drum.

3. In a hose reel, a hose carrying drum, a support therefor including a vertically disposed hollow member and a laterally disposed hollow non-rotatable member on which the drum is rotatably mounted, and a fluid supply line extending through said vertically and laterally disposed members and connected to the hose.

4. In a hose reel, a hose carrying drum, a swinging support therefor including a vertically disposed hollow member and a laterally disposed hollow non-rotatable member on which the drum is rotatably mounted, and a fluid supply line extending through said vertically and laterally disposed members and connected to the hose.

5. In a hose reel, a hose carrying drum, a support therefor including a hollow laterally disposed member on which the drum is rotatably mounted, and an independent fluid supply line leading through said laterally disposed member and connected to the hose, said supply line comprising a horizontal section and a radial drum section rotatably mounted on the horizontal section.

6. In a hose reel, a hose carrying drum, a swinging support therefor including a hollow non-rotatable laterally disposed member on which the drum is rotatably mounted, and a fluid supply line leading through said laterally disposed member and connected to the hose, said supply line comprising a horizontal section swinging on the axis of the support and a radial drum section rotatably mounted on the horizontal section.

7. In a hose reel, a hose carrying drum, a support therefor including a vertically disposed member and a non-rotatable laterally disposed member on which the drum is rotatably mounted, and a fluid supply line leading through said vertically and laterally disposed members and connected to the hose, said supply line comprising a vertical section, a horizontal section and a radial drum section rotatably mounted on the horizontal section.

8. In a hose reel, a hose carrying drum, a swinging support therefor including a vertically disposed member and a non-rotatable laterally disposed member on which the drum is rotatably mounted, and a fluid supply line leading through said vertically and laterally disposed members and connected to the hose, said supply line comprising a vertical section, a horizontal section swinging thereon and a radial drum section rotatably mounted on the horizontal section.

9. In a hose reel, a hose carrying drum, upper and lower bracket members, a support having upper and lower extensions swinging in said bracket members, said support also having a laterally disposed member on which the drum is rotatably mounted, and a fluid supply line comprising a vertical section passing upwardly through the lower extension, a horizontal section swinging on the vertical section and passing through the said laterally disposed member and a radial drum section rotatably mounted on the said horizontal section, said radial section being connected to the hose.

10. In a hose reel, a hose carrying drum, a swinging support therefor including a hollow non-rotatable laterally disposed member on which the drum is rotatably mounted, and a fluid supply line extending through said laterally disposed member and connected to the hose wound on the drum by a radial conduit swiveled on the supply line.

11. In a hose reel, a hose carrying drum, a support therefor including a vertically disposed hollow member and a laterally disposed hollow non-rotatable member on which the drum is rotatably mounted, and a fluid supply line extending through said vertically and laterally disposed members and connected to the hose by a radial conduit swiveled on the supply line.

12. In a hose reel, a hose carrying drum, a swinging support therefor including a vertically disposed hollow member and a laterally disposed hollow non-rotatable member on which the drum is rotatably mounted, and a fluid supply line extending through said vertically and laterally disposed members and connected to the hose by a radial conduit swiveled on the supply line.

In testimony, that I claim the foregoing as my invention, I have signed my name this 9th day of May, 1932.

RUDOLPH O. LUND.